US006301482B1

(12) United States Patent
Shohara

(10) Patent No.: US 6,301,482 B1
(45) Date of Patent: Oct. 9, 2001

(54) DMA CELLULAR RADIO SYSTEM WITH A CHANNEL QUALITY CRITERION

(75) Inventor: Aki Shohara, Sunnyvale, CA (US)

(73) Assignee: Stanford Telecommunications, Inc., Sunnyvale, CA (US)

(*) Notice: Subject to any disclaimer, the term of this patent is extended or adjusted under 35 U.S.C. 154(b) by 652 days.

(21) Appl. No.: 08/570,439

(22) Filed: Dec. 11, 1995

(51) Int. Cl.[7] .................................................... H04Q 7/20
(52) U.S. Cl. ........................... 455/452; 455/1; 455/67.3; 455/422; 455/450
(58) Field of Search ................................. 379/58, 59, 63; 455/33.1, 32.3, 34.1, 62, 63, 67.1, 67.3, 67.6, 56.1, 450, 451, 452, 453, 455, 464, 422, 562, 561, 1

(56) References Cited

U.S. PATENT DOCUMENTS

| | | | |
|---|---|---|---|
| 5,093,927 | * | 3/1992 | Shanley ................................. 379/63 |
| 5,157,709 | * | 10/1992 | Ohteru ................................. 379/58 |
| 5,243,598 | * | 9/1993 | Lee ..................................... 455/33.1 |
| 5,280,630 | * | 1/1994 | Wang ................................. 455/62 X |
| 5,309,503 | * | 5/1994 | Bruckert et al. .................... 455/33.4 |
| 5,365,571 | | 11/1994 | Rha et al. ............................... 379/59 |
| 5,448,753 | | 9/1995 | Ahl et al. ............................. 455/33.1 |
| 5,475,864 | * | 12/1995 | Hamabe ............................... 455/33.1 |
| 5,475,868 | * | 12/1995 | Duque-Anton et al. .............. 455/62 |
| 5,533,027 | * | 7/1996 | Akerberg et al. ................... 455/33.1 |
| 5,606,727 | * | 2/1997 | Ueda .................................. 455/34.1 |

* cited by examiner

Primary Examiner—Nay Maung
(74) Attorney, Agent, or Firm—Jim Zegeer

(57) ABSTRACT

The invention is a cellular radio system for terminals with narrowbeam antennas that provides demand assignment multiple access channel assignment under a guaranteed channel quality criterion. The invention features an efficient channel assignment algorithm that utilizes a database of measured the co-channel interference characteristics of subscriber terminals to eliminate significant co-channel interference in assigned channels. The use of measured terminal interference characteristics eliminates the occurrence of unexpected random occurrence of large co-channel interference in channel assignments thus permitting the use of more spectrally efficient cellular frequency reuse patterns.

1 Claim, 9 Drawing Sheets

Channel assignment subtable
Frequency group F1
Polarization = V

| Channel Number | Sector 1c Assigned? | Sector 1c Jammed? | Sector 3c Assigned? | Sector 3c Jammed? | Sector 7c Assigned? | Sector 7c Jammed? | Sector 9c Assigned? | Sector 9c Jammed? |
|---|---|---|---|---|---|---|---|---|
| C1 | | | | | | | | |
| C2 | | | | | | | | |
| C3 | | | | | | | | |
| C4 | | | | | | | | |
| C5 | | | | | | | | |
| C6 | | | | | | | | |
| C7 | | | | | | | | |
| C8 | | | | | | | | |

Fig. 7

Guaranteed signal-to-cochannel interference,
channel quality criterion Qc achievable @ net spectral efficiency level

| Frequency plan | Distance ratio | Conventional system Quality Qc @ efficiency E | Invention Quality Qc @ efficiency E(1-W)* |
|---|---|---|---|
| Fig. 5 M = 4, N = 2, P = 1 E = 200% | 5 | Qc ≤ 14dB @ E = 200% | Qc ≤ 14dB @ E(1-W) = 200% Qc = 20dB @ E(1-W) = 188% |
| Variation of Fig. 5 M = 4, N = 1, P = 1 E = 400% | 3 | Qc ≤ 9.5dB @ E = 400% | Qc ≤ 9.5dB @ E(1-W) = 400% Qc = 14dB @ E(1-W) = 384% |

*Note: overhead W by numerical calculation for 3 dB beamwidth = 3 deg.

Figure 9

DMA CELLULAR RADIO SYSTEM WITH A CHANNEL QUALITY CRITERION

BACKGROUND OF THE INVENTION

The invention is in the class of terrestrial cellular digital radio systems that provide demand assignment multiple access (DAMA) communications service to subscriber terminals equipped with narrowbeam radio antennas. Thus, the subject class of cellular radio systems has a set of terrestrial radio base stations distributed over the service area, where each base station is equipped with sector antennas, and each sector antenna has associated transmitter/receivers that communicate via frequency division multiplexed (FDM) radio wave with subscriber terminals in the vicinity of the base station. Communications is two-way with radio wave transmission in the direction from base station to terminal termed the downlink direction, and in the direction from terminal to base station termed the uplink direction. Each subscriber terminal, has a narrow beam antenna that is pointed into the aperture of one of the base station sector antennas assigned to the terminal. The terminal antenna has an associated transmitter and a receiver tunable to assigned sector FDM channels. The channel assignment originates in a service center on a DAMA basis.

The FCC allocates a block of radio spectrum for specified terrestrial cellular radio services. The radio frequency band allocated to a cellular radio system is a precious natural resource, and it is of utmost concern to national and international regulatory agencies that the allocated radio spectra be efficiently used. For the cellular radio service providers increased spectral utilization efficiency implies reduction of the density of base stations required to cover a given service area. The resultant reduction of infrastructure cost may then result in reduction of service cost to subscribers. Thus, the realization of increased spectral utilization efficiency of cellular radio systems, which is the objective of the invention has important economic and social benefits. Cellular radio systems employ frequency reuse of the block of spectra allocated to the cellular system in order to achieve high spectral efficiencies. Typically the allocated block is partitioned into two parts, one part for radio wave transmission from base stations to the subscriber terminals, hereafter defined to be the uplink direction, and the other part for radio wave transmission from terminals to base stations, hereafter defined to be the uplink direction. The uplink part is further partitioned into frequency-division multiplexed (FDM) channels, and the channels are partitioned into N groups of channels F1, F2, . . . , FN, where the number N is defined as the frequency reuse number. Each sector antenna of the cellular system is allocated one of the channel groups in such a way that for large numbers of sectors, the frequencies are reused. All sectors assigned the same channel group are termed co-channel sectors. A natural consequence of frequency reuse in cellular radio systems is that transmissions in the channel of one sector have the potential to interfere with transmissions in nearby co-channel sector and such interference is termed co-channel interference. Cellular systems utilize frequency allocation patterns that approximate idealized regular patterns known to have minimal co-channel interference levels for a given frequency reuse number N. The level of co-channel interference in a channel is defined in this disclosure as significant if it causes the channel to fail a defined channel quality criterion such as bit error rate.

In this disclosure spectral efficiency is defined as $E=MP/N$ where M is the number of sectors per cell in a cellular pattern, and N is the number of channel groups. The efficiency thus equals the number of times the allocated frequencies are reused at each base station. The factor P is accounts for polarization usage and is generally equal to one. In the special case when both polarizations of a channel group are allocated to a sector, then P=2. For fixed base station complexity (M fixed) in general, reduction of the frequency reuse number N in an attempt to increase efficiency tends to generally increase the level of co-channel interference in the system so that there exists a fundamental tradeoff of spectral efficiency with the level of co-channel interference present in the network.

Conventional DAMA channel assignment algorithms associated with prior art typically treat all terminals uniformly without attempting to ascertain the co-channel interference characteristics of the terminal. A drawback to the conventional approach is that in order to guard against the random occurrence of unexpectedly large co-channel interference in assigned channels the use of spectrally inefficient cellular patterns with large reuse number N is needed, particularly when a guaranteed channel quality criterion is required by terminals.

Typically, design in prior art of cellular radio systems have been based on the requirements of mobile voice telephony service. However, the data transport requirements of an emerging new generation of broadband telecommunications services to be offered on cellular radio system are much more demanding in terms of the cellular system channel quality. Examples of such new generation services are interactive multimedia such as video conferencing, and video on demand. Two new data transport requirements that characterize the new generation services are (1) guaranteed channel quality and (2) DAMA channel assignment with short response times, typically measured in milliseconds or tens of milliseconds. Guaranteed channel quality means that channels that are assigned to terminals are guaranteed to meet some specified channel quality criterion such as bit error rate.

The allocation of ever higher frequencies of the radio spectrum by the FCC enables the use of relatively narrower terminal antennas of reasonable cost and size. For example, spectral allocation for local multipoint distribution systems (LMDS) has been recently allocated at 28 Ghz, and for that application low-cost terminals with beamwidths of a few degrees is feasible. Narrow beams have a known advantage in terms of mitigating multipath interference and reduction in the general level of co-channel interference. The objective of the present invention is to take advantage of the fact that the proportion of significant co-channel interferers in the system is typically very small so that special treatment in channel assignment for that population is possible. The objective of the present invention is to provide DAMA channel assignment under a guaranteed channel quality criterion and with much higher spectral efficiencies than prior art. This is achieved by measuring the co-channel interference characteristics of terminals. Knowledge of terminal interference characteristics is used by the DAMA channel assignment algorithm to control the co-channel interference in a systematic way so that all significant uplink co-channel interference is diverted into a relatively small number of unassigned channels. Similarly, the algorithm minimizes the number of downlink channel assignments that can induce significant downlink co-channel interference, and prohibits the assignment of those channels. The invention is applicable for example to LMDS systems.

DESCRIPTION OF THE INVENTION

SUMMARY OF THE INVENTION

The invention is a terrestrial cellular radio system comprised of a plurality of base stations distributed about a service area, and a plurality of subscriber terminals in the service area. Each base station has M sector antennas that service an area termed a cell that is centered at the base station. Each antenna defines a cell sector that has a channel FDM subgroup allocated for uplink communications and an FDM channel subgroup allocated for downlink communications in a cellular reuse pattern. Each terminal is assigned to one of the sectors according to a sector assignment algorithm, and the terminal's antenna is accordingly pointed at the sector antenna to which it is assigned. Terminals request and receive assignment of channel resources from the channel group allocated to the sector from a DAMA channel assignment algorithm.

A unique feature of the invention is that its DAMA channel assignment procedure utilizes a database of prior information about the co-channel interference characteristics of terminals to assign channels in such a way that excessive co-channel interference gets harmlessly concentrated into a relatively small number of channels marked for interference and not assigned for communications. In this way the channel assignment algorithm is capable of offering guaranteed channel quality while avoiding the large frequency reuse numbers required in prior art to achieve such guarantees. In this way the invention maintains a high level of spectral utilization efficiency. The invention provides for automated means to generate the database of prior information about terminal characteristics, and the database is also used to ensure that adjacent channel interference is not excessive and received signal power is adequate to meet the guaranteed channel quality criterion.

The invention is based on two key observations about uplink co-channel interference when subscriber terminal antennas have narrow beamwidths: (1) typically only a small proportion of terminals are significant co-channel interferers, and (2) when a terminal is a significant co-channel interferer its transmissions typically only interfere with at most one nearby co-channel sector. In the invention, the DAMA uplink channel assignment procedure assigns channels to the relatively small number of subscribers known to be co-channel interferers in such a way that the co-channel interference always falls in one of a relatively small number of channels reserved only for such interference. The channels marked for interference are not assigned for communications in the sector in which the interference occurs so that significant co-channel interference is virtually eliminated from the channels assigned and used by terminals. Although the channels marked for interference represent wasted overhead, they are not only small in number relative to the totality of available channels, but also smaller in number than the population of terminals that are significant co-channel interferers. This is because under the DAMA assignment algorithm each unused channel marked for interference typically contains co-channel interference from more than one terminal. The invention works similarly for downlink assignments except that the location of interferer and interfered radio is reversed; i.e., certain downlink channels are marked as unassignable in certain sectors because they cause co-channel interference in terminal receivers in neighboring co-channel sectors.

BRIEF DESCRIPTION OF DRAWINGS

The above and other objects, advantages and features of the invention will become more clear when considered with the following specification and accompanying drawings wherein:

FIG. 7 is an example table showing a calculation of spectral efficiency, for the invention versus conventional systems, for a given channel quality criterion and for R-squared propagation law.

FIG. 9 is a flow diagram of the DAMA channel assignment algorithm for the uplink.

DETAILED DESCRIPTION OF PREFERRED EMBODIMENTS

Figure 1:
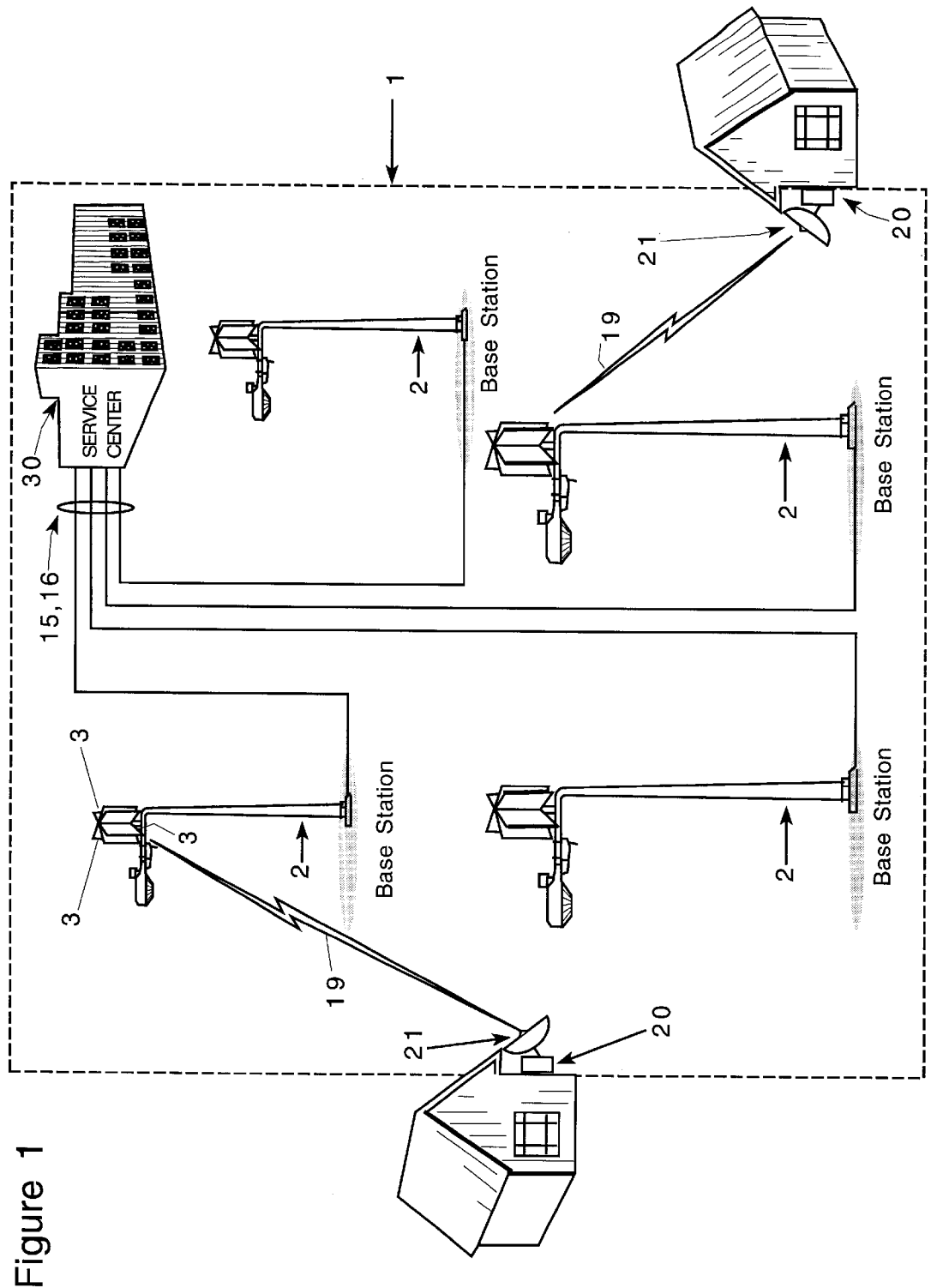
FIG. 1 is a diagram that illustrates the elements of the cellular radio system.

Referring to FIG. 1, the invention is a terrestrial cellular radio system [1] that comprises a plurality of base stations [2], plurality of subscriber terminals [20] with narrow-beam antennas [21], and a service center [30]. The base stations [2] are distributed over a service area in a spatial pattern that roughly approximates an idealized cellular plan. Each base station has a number M of sector antennas [3] that radiate radially from the base station, where the number M is typically the same over regions of the service area having the same subscriber density, and typical values of M are 3 (120-degree sectors), and 4 (90-degree sectors), although omnidirectional antennas (M=1) are not excluded. Typically the sector antennas of a base station provide service coverage of a region centered at the base station. Each terminal communicates by line-of-sight or near line-of-sight radio wave propagation path [19] from terminal antenna [21] to an assigned base station sector antenna [3]. Trunk lines [15], [16] relay terminal communications data from base stations to the service center [30] where interconnection to telecommunications services occur.

Figure 2:
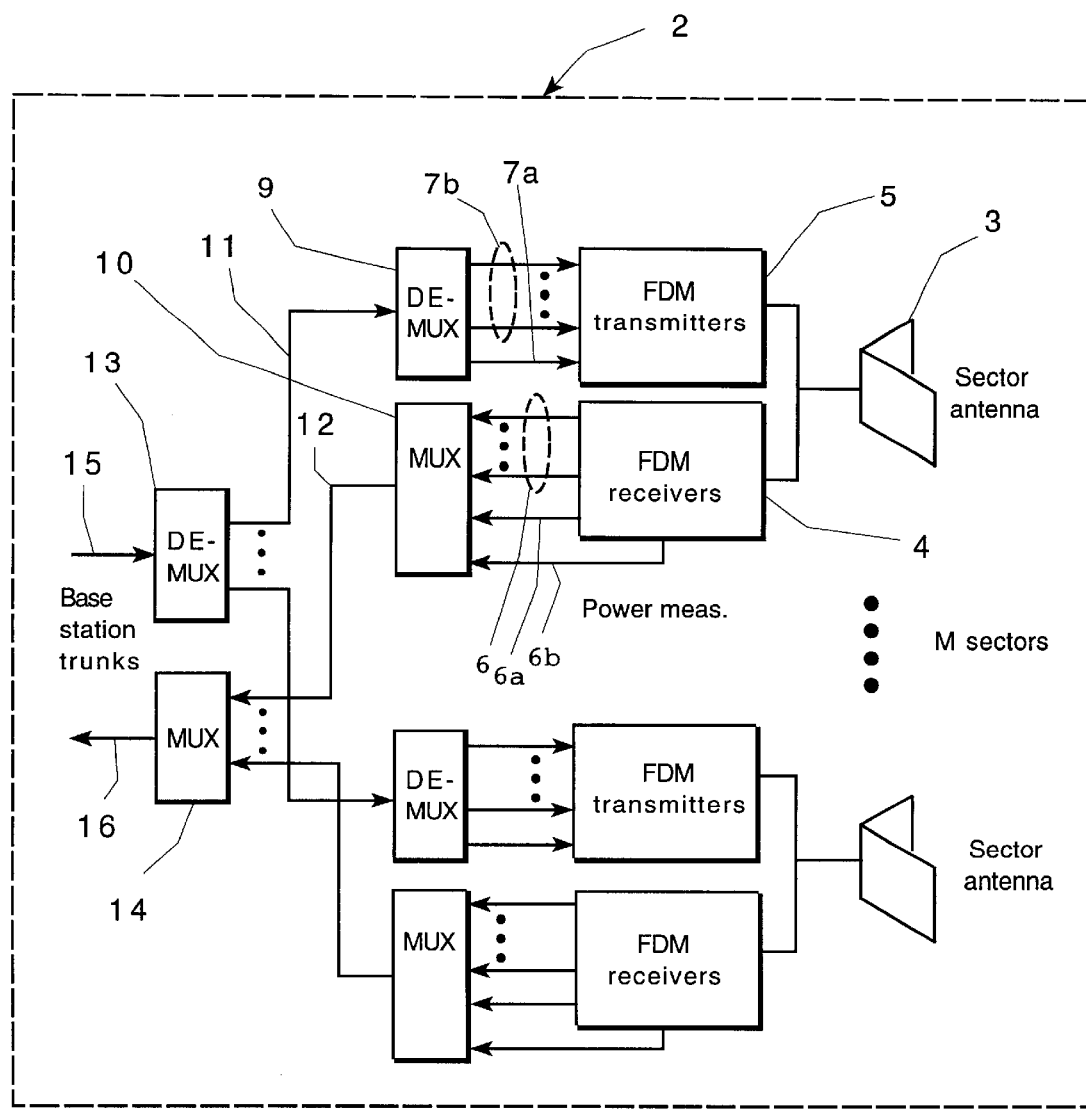
FIG. 2 is a diagram that illustrates the elements of a base station.

FIG. 2 shows by way of typical example the structure of each base station. Each base station sector antenna [3] is connected to a set of frequency division multiplexed (FDM) radio transmitters [5] that generate a set of FDM radio channels for downlink digital communications. The FDM channel radio frequencies are a set F that is allocated to a sector. Similarly, each base station sector antenna [3] is connected to a set of FDM radio receivers [4] having a set of FDM uplink radio frequency channels for digital communications with allocated set G of radio frequencies.

One of the radio channels of an uplink FDM set is reserved for uplink net management (NM) data and all other radio channels of the FDM set are assigned for uplink user data. Similarly, one of the radio channels of each downlink FDM set is reserved for downlink NM data and all other radio channels of the FDM set are assigned for downlink user data Each receiver of an FDM receiver set [4] demodulates a digital data stream [6] of an uplink channel where the data is uplink NM data [6a] for the NM channel, and uplink user data [6b] for all other channels of the FDM set. Additionally, the receiver for the uplink NM channel measures power in the NM channel, with resultant power measurement data [8]. Demodulated uplink data [6a] and [6b] are multiplexed [10] to form a downlink sector trunk [12] which is multiplexed

[14] with all other downlink sector trunks of the base station to form the uplink base station trunk [16] which is routed to the service center. Similarly, but in the reverse direction, the downlink base station trunk [15] from the service center is demultiplexed [13] to yield downlink sector trunks [11] for each sector of the base station, and each downlink sector trunk [11] is further demultiplexed [9] to yield the downlink NM data [7a] for the downlink NM channel, and the user data [7b] for each of the downlink user data channels of the sector. The downlink data [7] for each channel is modulated onto the channel waveform by respective FDM channel transmitters [5].

Figure 3:
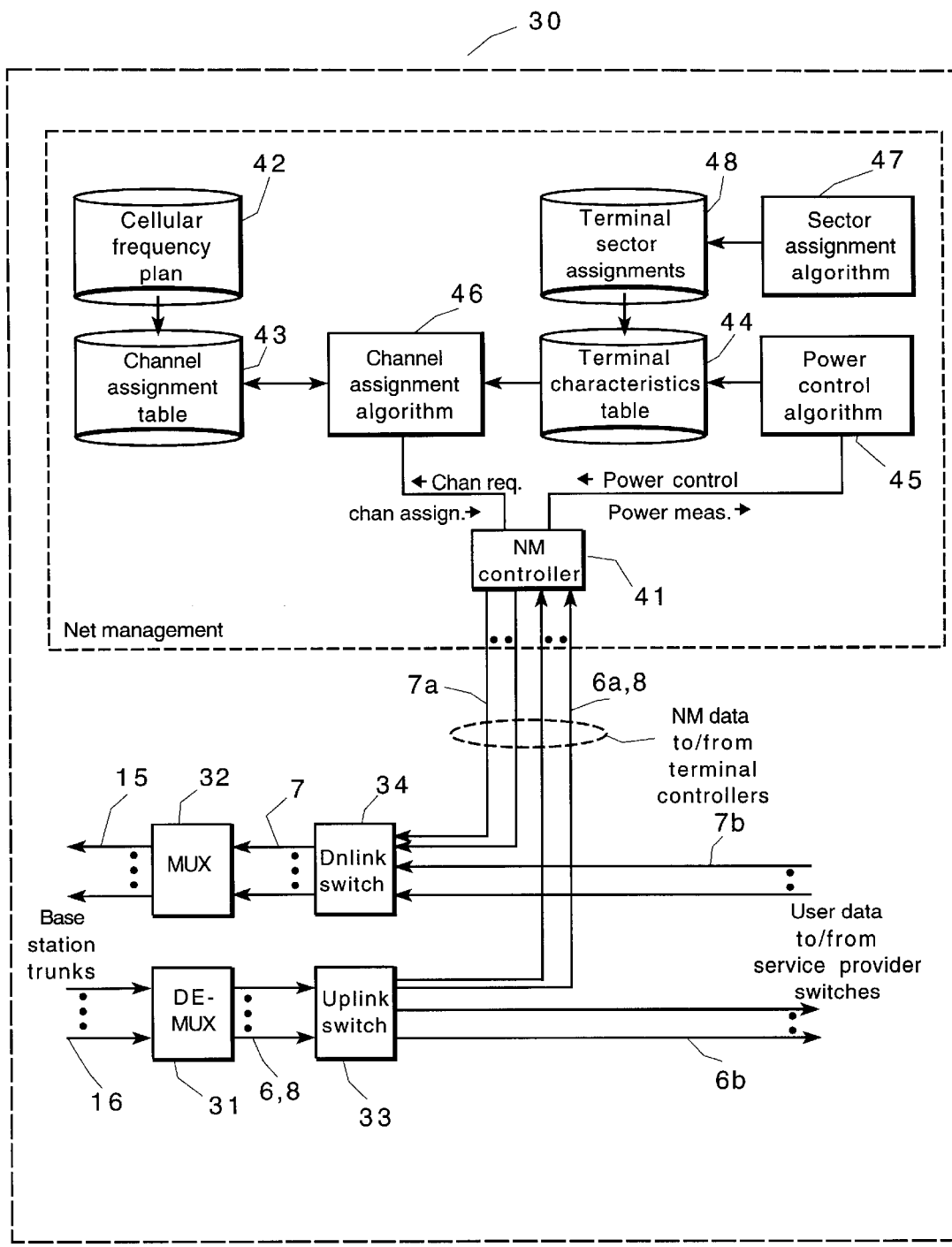
FIG. 3 is a diagram that illustrates the elements of the service center and net management.

FIG. 3 shows by way of typical example the structure of the service center and the net management functions contained therein. At the service center [30] each incoming uplink base station trunk [16] is demultiplexed [31] to obtain uplink data [6] for all uplink channels of all sectors of the base station, and power measurements [8] for each NM channel of each sector of the base station. The uplink NM data [6a] and power measurements [8] of each sector of each base station are routed by switch [33] to net management [40] in the service center, and the uplink user data [6b] is routed to service provider switches. Switch control is exercised by the NM controller that has knowledge of the required switch mapping of trunk channels to terminals and the telecommunications services to terminals. Similarly but in the reverse direction, downlink user data [7b] from service providers, and downlink net management data [7a] are switched [34] and multiplexed [32] into the appropriate base station trunk [15].

Generally for cellular radio systems, net management refers to control for efficient usage of cellular radio system resources, and the description of net management describes only novel net management functions or those functions that support novel or unique aspects of the invention. Net management is coordinated by the controller [41], and comprises two types of data processing elements: (1) data bases which include the cellular frequency plan [42], channel assignment list [43], terminal characteristics table [44], and terminal sector assignments [48]; and (2) algorithms for channel assignment [46], for power control [45], and for sector assignment [47]. The net management elements are typically embodied in microprocessor firmware and executed by microprocessor and supporting data processing peripherals, but implementation in discrete logic is also possible.

Figure 4:
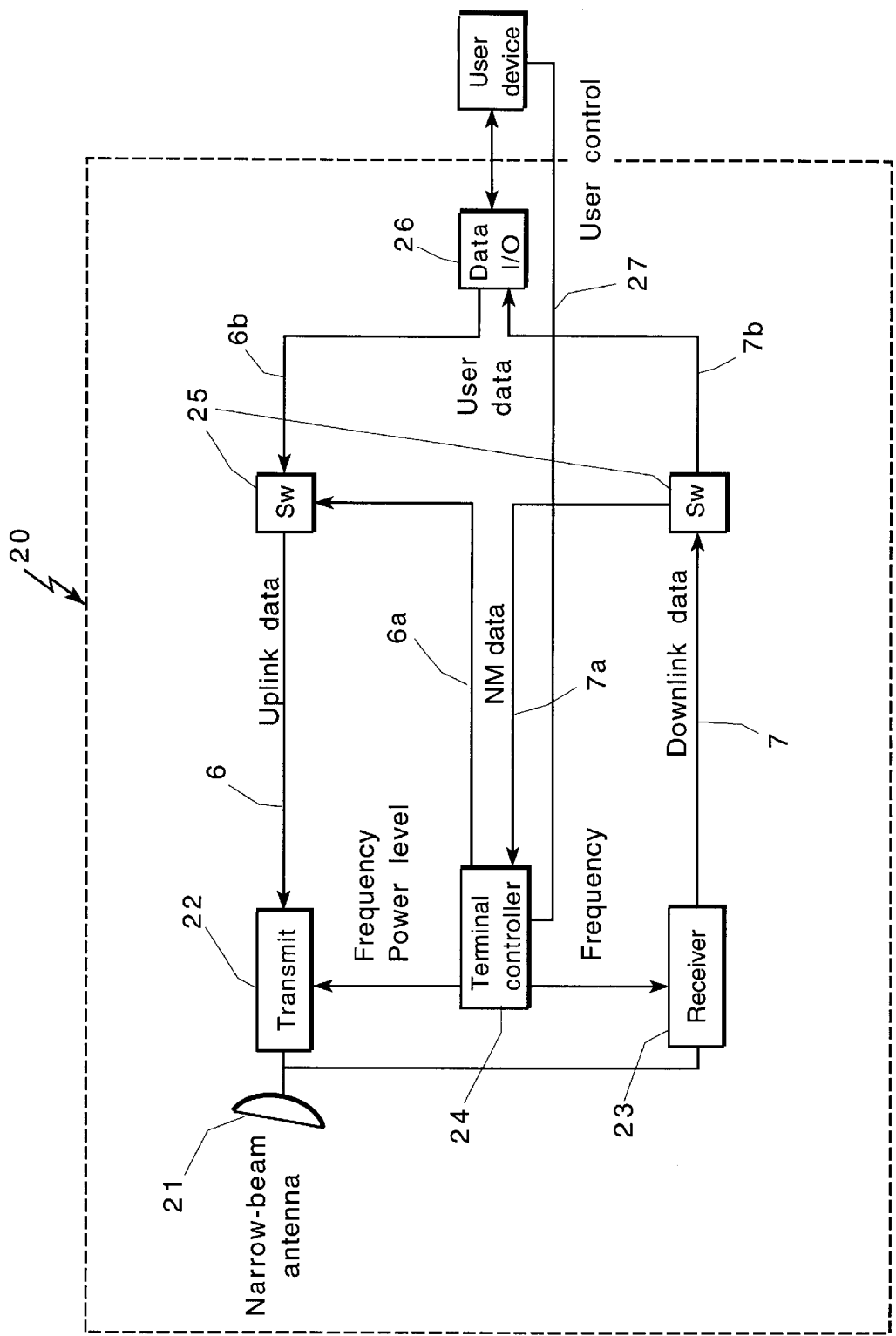
FIG. 4 is a diagram that illustrates the elements of a subscriber terminal.

FIG. 4 shows by way of typical example the structure of a terminal. Each terminal [20] has a radio transmitter [22] with means to tune to any uplink FDM channel frequency of a sector and means to vary output power level. Each receiver [23] has means to tune to any downlink FDM channel frequency of a sector. Both transmitter and receiver are connected to the terminal antenna [21]. The terminal controller [24] controls uplink frequency, downlink frequency, and transmitter power level. The transmitter [22] modulates uplink digital data [6] onto the uplink channel, and if the channel is the NM channel, the digital data is uplink NM data [6a] that is routed by the switch [25] from the terminal controller [24]. Otherwise, the uplink digital data [6] is user data [6b] that is routed from an external data input/output port [26]. Similarly the receiver [23] demodulates downlink digital data [7] from the downlink channel, and if the channel is the NM channel the digital data is downlink NM data [7a] which is routed by switch [25] to the terminal controller; otherwise the data is downlink user data [7b] which is routed by switch [25] to the external user data input/output (I/O) port [26]. Subscribers utilize the user data port [26] for interconnections of subscriber telecommunications user devices such as phones, modems, personal computers, and multimedia devices with the telecommunications services interconnected at the service center.

Referring jointly to FIGS. 3 and 4, the NM controller [41] controls terminals and their usage of system resources by two-way NM communications of NM messages [6a], [7a] with terminal controllers via base stations. Each terminal controller establishes a communications connection to the NM management controller when it tunes its transmitter [22] and receiver [23] to the net management channel of the sector assigned to the terminal. The sharing of a single net management channel by the multitude of terminals assigned to the sector may be managed by any suitable means known to those skilled in the art. For example, round-robin polling by the NM controller may be used for slow net management services such as terminal status monitoring, and random access used by terminals for rapid channel assignment requests. Uplink NM messages [6a] originating at a terminal that are relevant to the invention include (1) service request, (2) service logoff, and (3) terminal status; messages, and (4) net entry uplink. Downlink NM messages [7a] originating at the NM controller that are relevent to the invention include (1) service response, (2) power control.

Referring to FIG. 3, the cellular frequency plan [31] in the service center net management is a database table that defines the current allocation of FDM channel frequency groups to base station sectors. The uplink and downlink spectra allocated by the FCC to the cellular system are each partitioned into FDM channels. For the uplink, the channels are grouped into FDM channel groups F1, . . . , FN, and similarly FDM channel groups G1, G2, . . . , GN for the downlink. Each cell sector is allocated one of the downlink channel groups for the sector transmitter set [5] and one of the uplink channel groups for the sector receiver set [4], and the aggregate allocations over the service area define the frequency reuse pattern or frequency plan.

Figure 5:
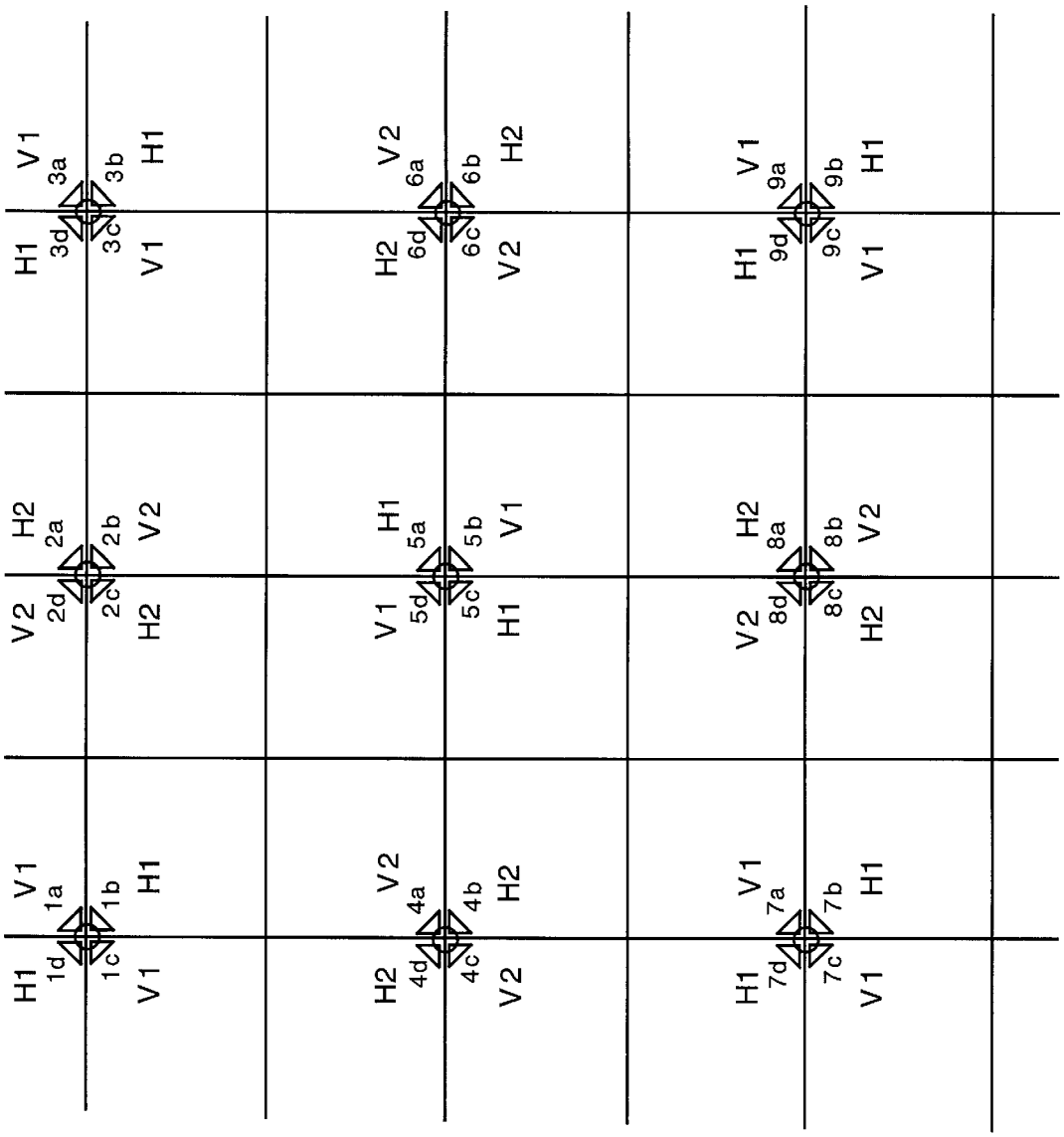
FIG. 5 is an example of a cellular plan.

An example of a cellular frequency plan suitable for narrowbeam antennas is shown in the example in FIG. 5. In FIG. 5, the cellular frequency reuse pattern is for square cells with M=4 90-degree sectors per cell, where base stations are labeled 1 through 9, and sectors are labeled a,b,c,d, so that sector c of base station 1 is labeled 1c, and so forth. Polarization isolation is used to reduce co-channel interference, where V denotes vertical polarization, and H denotes horizontal polarization, but only one polarization is used per sector so that P=1. There are N=2 frequency groups F1 and F2, and the assignment of frequency group Fi is denoted either Vi or Hi according to whether that frequency group is vertical or horizontal polarization. The spectral utilization efficiency of the FIG. 5 example is E=MP/N= 200%.

Figure 6:
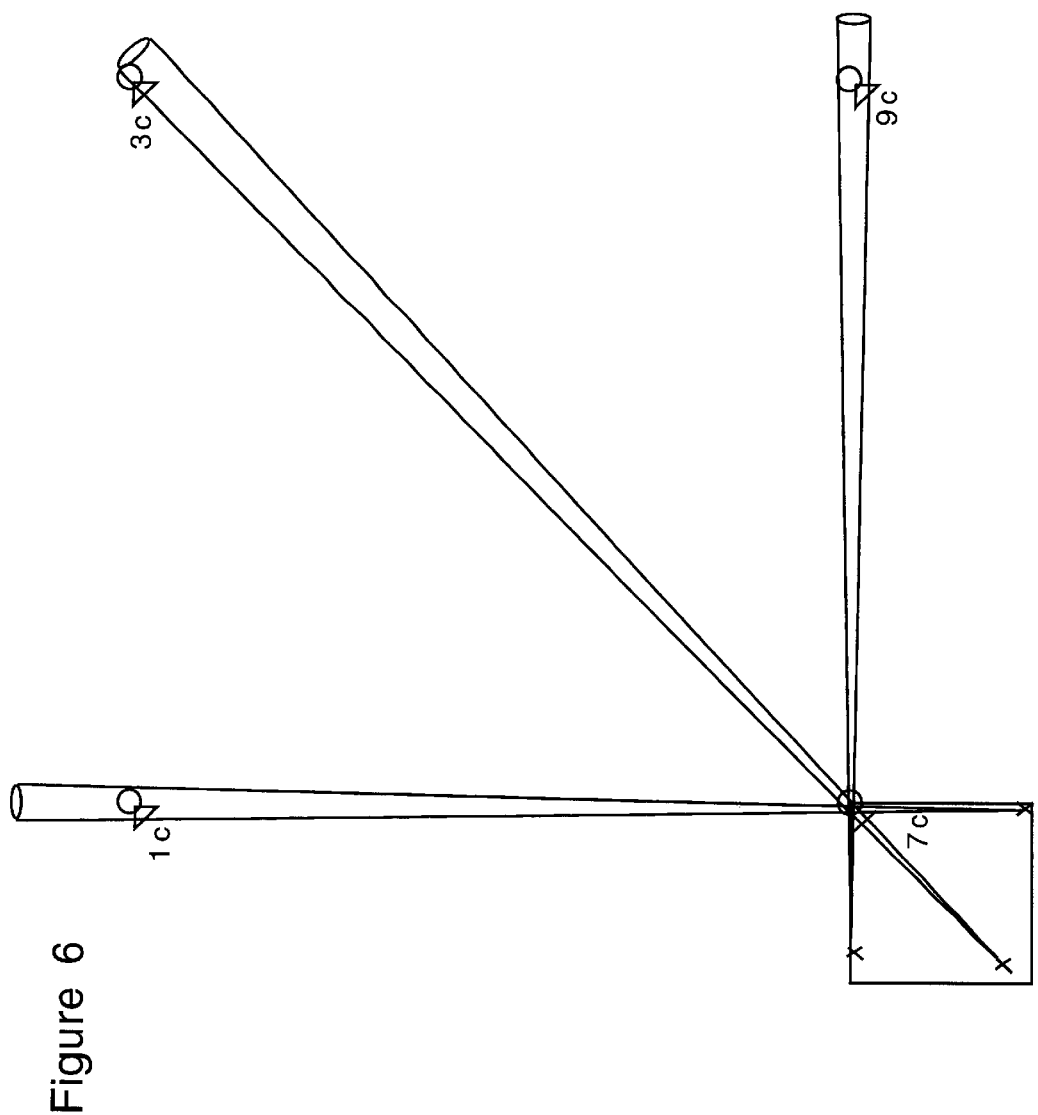
FIG. 6 is an illustration of the geometry of uplink co-channel interference generated by interferers in sector 7c of FIG. 5

Importantly, the invention is based on special properties of co-channel interference when narrow-beam terminal antennas are used. By way of illustration of the special properties, FIG. 6 shows the conditions for a terminal in sector 7c to be an uplink co-channel interferer in one of three possible neighboring first-tier co-channel sectors. A terminal in sector 7c can be a co-channel interferer in a neighboring co-channel sector only if its narrow beam looks into the aperture of a co-channel sector with the same polarization, and this is possible only in sectors 1c, 3c or 9c in FIG. 5. Thus co-channel interference is possible only if the assigned sector and the co-channel sector line up in the narrow terminal beam. It is also evident in the geometry of FIG. 5 that for narrow-beam terminal antennas, a terminal can be a significant co-channel interferer in at most one co-channel sector. This implies that there is only a narrow strip of terminal locations around the perimeter of sector 7c where a terminal can be a co-channel interferer. For randomly placed subscriber terminals in a sector, the proportion of terminals that are co-channel interferers will presently shown to be very small. The invention first determines which terminals are significant co-channel interferers by means of measurements in the following way.

The invention utilizes power control of transmitter power levels to achieve a system-wide uniform received signal power level S at base station sector receivers. The power control has two objectives (1) minimize uplink adjacent channel interference in sector FDM receivers, and (2) provide known power reference levels to enable accurate measurement of co-channel interference characteristics of terminals. Both objectives are important supporting features of the invention in providing guaranteed channel quality as presently described. The terminal controller [24] causes each terminal transmitter [22] to transmit status messages [6a] at roughly periodic intervals, either in response to polling messages [7a] from the NM controller [41] in the service center, or in synchrony with preassigned status message time slots in the uplink net management channel. The power level of all status message are measured in the net management channel receiver of each base station sector. Based on power measurements received the power control algorithm [45] in the service center sends power directive NM messages to each terminal controller [24] to cause iterative adjustment of terminal transmitter power level until all signal power levels at all sector receivers converge to the same target power level S.

After convergence of received terminal transmission to target power levels, the power control algorithm gathers measured power levels Ic [10] of each terminal's status message transmission in neighboring co-channel sectors, and the associated co-channel interference ratio S/Ic computed. If a terminal's status message transmissions cause measured co-channel S/Ic to fall below, or violates, a co-channel interference quality criterion Qc, the co-channel interference is termed significant, and the terminal termed an interferer; and the corresponding sector in which the significant co-channel interference occurred is hereafter termed the jammed sector. That is, there is associated with each interferer a jammed co-channel sector. The power measurement algorithm generates a table of terminal characteristics which tabulates by terminal ID following data: (1) the assigned sector ID, (2) whether a terminal is an interferer or a non-interferer, and if an interferer, (3) the ID of the associated jammed sector wherein the terminal induces the significant level of co-channel interference.

The following is a description of the novel DAMA channel assignment algorithm of the invention for uplink channels; and the downlink channel assignment algorithm is analogous. At the instigation of a control signal [27] received by a terminal from its external user device, a terminal generates a service request message [4a] which is received by the NM controller at the service center [30]. Referring to FIG. 3, the service request message implies a request for two resources jointly, (1) interconnection to a specified telecommunications service at the service center, and (2) channel assignment of base station FDM user channel resources as required to support the interconnection or data transport. The channel assignment is performed by the channel assignment algorithm [46] by searching for an available channel in the channel assignment table [43] in the following way. The channel assignment table [43] is a state machine representing current channel assignments and co-channel interference conditions in the system, and there are 2N subtables, one subtable for each uplink and downlink channel group and for each polarization used. FIG. 7 illustrates a subtable example for the FIG. 5 frequency plan, for frequency group F1, with vertical polarization. The co-channel sectors in the subtable are 7c, 1c, 9c, and 3c. The row indices correspond to all the channels in the channel group F1, and for simplicity only 8 channels are illustrated for the group as C1, C2, . . . , C8. The column heading give sector ID's for the four co-channel sectors. Each channel can be assigned at most once in each sector, so each sector has a column for marking channels that are assigned to terminals. Each channel in each sector can be jammed, i.e., suffer significant co-channel interference, so each sector has a second column to mark if a channel is jammed. The channel assignment algorithm marks a channel as assigned in a sector when the channel is assigned to a terminal in the sector. If the terminal is an interferer, the channel must be marked as jammed in the column corresponding to the jammed sector. In this way the channel assignment subtable indicates the state of current assignments in all co-channel sectors and which channels are jammed in all co-channel sectors.

Figure 8:
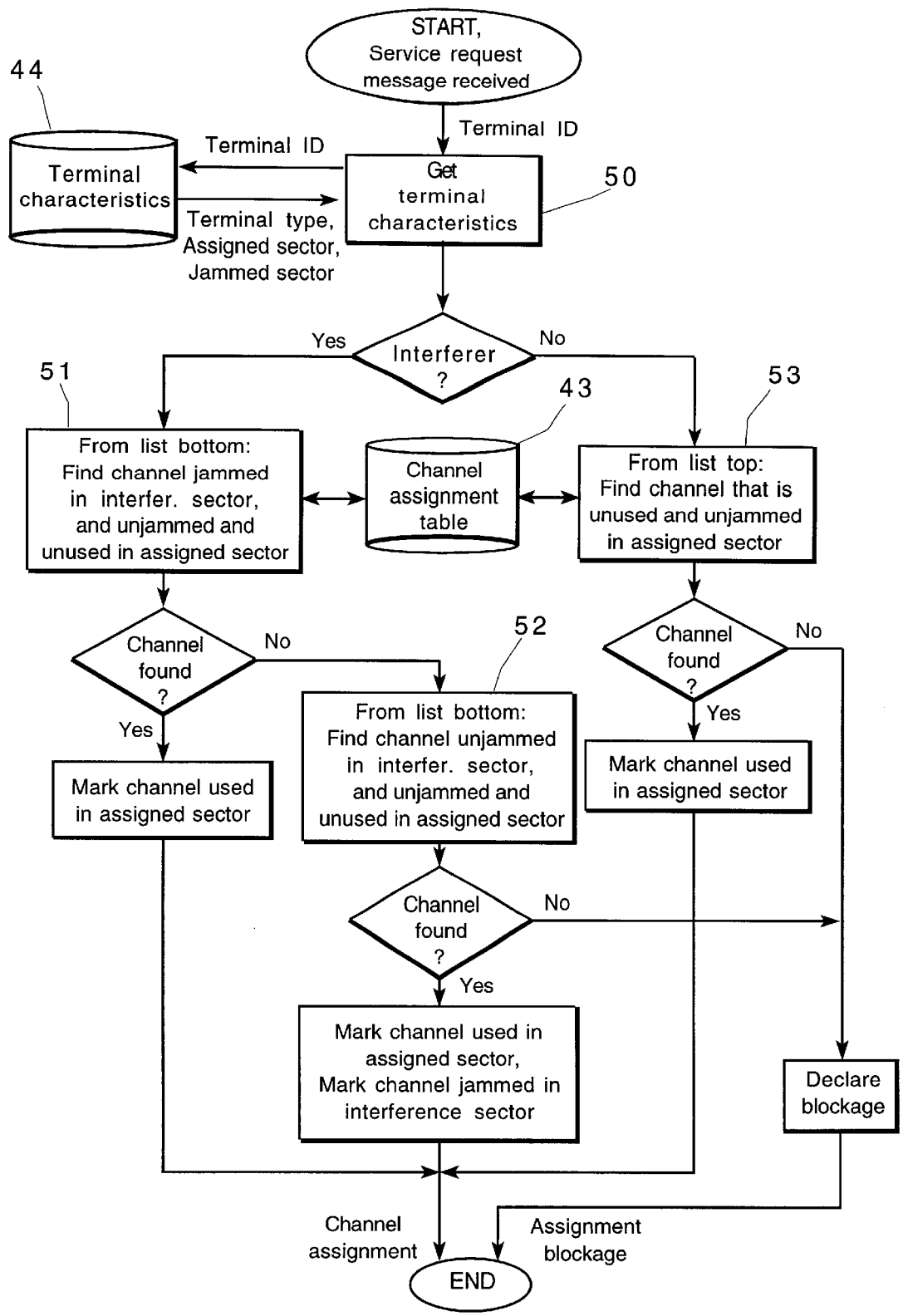
FIG. 8 is an illustration of the tabular data contained in the channel assignment list.

The channel assignment algorithm [46] utilizes the channel assignment table [43] to assign channels under a channel quality constraint. Referring to FIG. 7, the following assignment restrictions are evident. For a guaranteed channel quality criterion, the channel assignment algorithm may not assign a channel in a sector (1) to any terminal if that channel is marked as jammed in that sector, or (2) to an interferer terminal if that channel is currently assigned in the interferer's jammed sector. Restriction (1) is necessary to avoid assignment in a channel containing significant co-channel interference that violates the channel quality criterion, and restriction (2) is necessary to preclude the possibility that a new channel assignment may cause jamming of a currently assigned channel, thereby causing the currently assigned channel that previously met the quality criterion to now fail the quality criterion. Relative to the FIG. 7 example, there are 2N−1 other subtables in the channel assignment table for the other 2N−1 channel groups, but all 2N−1 subtables are independent state machines because co-channel interference is confined to co-channel sectors Referring to FIG. 8, which illustrates a flow graph for the channel assignment algorithm for the uplink, the channel assignment algorithm first retrieves [50] the terminal characteristics, i.e., the terminal type (interferer or non-interferer), assigned sector ID, and if an interferer, the jammed sector ID. Then the channel assignment algorithm searches the terminal sector's channel assignment subtable, where the search procedure [51][52] starts at the bottom of the subtable if the terminal is an interferer, and starts at the top of the subtable if the terminal is a non-interferer [53]. The channel assignment logic in either case obeys the restrictions described earlier associated with guaranteed channel quality criterion. The channel assignment algorithm optimally concentrates significant co-channel interference into the smallest number of jammed unassigned channels. Thus, for the case of interferer terminals, the search for channel assignments [51] initially attempts a channel assignment that causes the resultant co-channel interference generated by the terminal to fall on an already jammed channel in the jammed sector. The efficiency of concentrating co-channel interference into a few unassigned channels is further enhanced by maximal separation of interferers and non-interferers at opposite ends (top and bottom) of the channel assignment subtable by the channel assignment algorithm. This is because when a jammed channel exists, concentration of additional co-channel interference in the jammed channel implies additional assignment of channels in the same row of the subtable. If a non-interferer is assigned in the same row of the subtable, one potential opportunity for co-channel interference concentration is removed.

The channel quality criterion was based on a signal-to-co-channel interference metric. The invention applies to more general channel quality criteria. For example, for a channel quality criterion based on bit error rate (BER) metric, the channel quality criterion can be decomposed by techniques known to those skilled in the art into three joint criteria: (1) signal-to-co-channel interference ratio $S/I_c>Q_c$, (2) signal-to-noise ratio $S/N>Q_n$, and (3) signal-to-adjacent channel interference ratio $S/I_a>Q_a$. The channel assignment algorithm [46] ensures that each assigned channel meets criterion (1) relative to co-channel interference impairment. The criterion (2) relative to thermal noise impairment can be implicitly met by setting the system wide target received power level S of the power control algorithm [45] high enough above the thermal noise level to meet the criterion. The criterion (3) relative to adjacent channel interference impairment can be met by well-known waveform design techniques and channel spacing procedures known to those skilled in the art. In this way the invention provides for a guaranteed BER quality criterion.

The efficiency of the channel assignment algorithm is computed as follows for narrow-beam terminal antennas. For a given channel quality criterion, the proportion W of terminals that are interferers is first determined. Because the algorithm concentrates co-channel interference into the unassigned jammed channels, and each interferer terminal jams at most one co-channel sector, the overhead associated with unassigned, jammed channels is upper-bounded by W. Hence for efficiency E associated with a cellular frequency plan, the net spectral efficiency of the invention greater than $E(1-W)$. But for narrow-beam antennas, W is small (much less than one) so that $E(1-W) \approx E$. Thus, the idea of the invention is to start with a frequency plan with associated high spectral efficiency E that causes co-channel interference levels to be present in the system at a level that violate the channel quality criterion. However, the channel assignment algorithm will ensure through measurements that the channels with significant co-channel interference levels will not be assigned to terminals.

In order to demonstrate the benefits of the invention numerically, the table of FIG. 9 shows a simplified comparison of efficiency and achievable channel quality criteria for both conventional DAMA channel assignment algorithm and the invention algorithm for the special case where propagation loss is proportional to range-squared. Two frequency plans are considered, the plan in FIG. 5 with efficiency E=200%, and a modification of FIG. 5 in which all frequencies are assigned to each sector (N=1) so that E=400%. The second column of the table indicates the distance ratio r which is the minimum distance ratio of base station-to-co-channel interferer over base-station-to-assigned terminal. The conventional algorithm is assumed to be one that simply assigns any channel that is unassigned in the terminal's assigned sector. The conventional algorithm can guarantee any channel quality criterion Qc for signal-to-co-channel interference ratio only if $Q_c \leq 20\log(r)$ at spectral efficiency E, and this is indicated in column 3. For $Q_c \leq 20\log(r)$ the conventional algorithm cannot meet the channel quality criterion at any spectral efficiency level. The invention can do as well as the conventional algorithm for $Q_c \leq 20\log(r)$ and can meet larger fidelity criteria as well at a small cost in overhead W. For example, for a quality criterion of Qc=14 dB, the invention can use the frequency plan with frequency reuse number N=1 and efficiency E=400%. This is at a calculated overhead of W=0.04 for an assumed beamwidth of 3 degrees. Thus, the net efficiency for the invention is E(1-W)=384% for Qc=14 dB. The conventional system is required to use the frequency reuse number N=2 for quality criterion Qc=14 dB, with resultant spectral efficiency E=200%.

The preceding description of the novel DAMA channel assignment algorithm applied to the uplink. For the downlink, the channel algorithm is analogous where the role of the interferer and the object of interference is reversed relative to the case for the uplink. Thus for downlink assignments, each terminal is labeled as either susceptible to co-channel interference or non-susceptible, and for each susceptible terminal there is the associated sector which is the source of the interference, and which is recorded in the terminal characteristics database. The downlink channel assignment table is analogous to the uplink channel assignment table of FIG. 7, with each column for marking of forbidden jammed channels on the uplink replaced with a column for marking of forbidden jamming channels on the downlink. The downlink channel assignment algorithm is analogous to the uplink channel assignment algorithm of FIG. 8 in an obvious way. For example, if a terminal is susceptible to co-channel interference, the algorithm first looks at the assignments in the interfering sector and attempts to find a forbidden channel that is marked as an interferer, for assignment in the terminal's sector. The spectral efficiency of the algorithm for the downlink is computed analogously and hence is as efficient as the uplink if the same modulation, quality criterion, and frequency plan is used.

The invention is extendable in ways obvious to those skilled in the art to the case where terminal narrowbeam antennas are steerable as in phased arrays and terminal motion occurs only between channel assignments.

The invention is extendable in ways obvious to those skilled in the art to the case where each of the FDM channels may be partitioned into smaller spectral units for assignment such as time-division slots, or code-division channels.

While preferred embodiments of the invention have been described and illustrated, other embodiments, modifications and adaptations of the invention will be readily apparent to those skilled in the art.

What is claimed is:

1. A cellular Demand Access Multiple Access radio communications system comprising pluralities of terminal stations and base stations having transponders and antennas, and a master station, wherein stationary terminal stations' antennas are directive so as to reduce the number of other terminal stations and base stations whose signals they can intercept, the base station transponder and terminal stations within each cell are preassigned a subset of the available frequency channels, control signals are transmitted bidirectionally between each base station antenna and each of its terminal stations, the strengths of received direct signals, co-channel interfering signals and noise are measured during these transmissions, and stored in a master station communicating with all base stations, results of said measurements being used, upon request from a terminal station for assignment of a communication channel, to determine whether any available channel can meet the terminal user's requirements for co-channel, adjacent channel interference and noise;

wherein control of signal quality is ensured by passing control signals between base and terminal stations, monitoring the interference and noise levels in the receivers, storing the results digitally in the master station, and using programmed logic to select an optimum channel and signal level for each assignment;

wherein said programmed logic selects an optimal channel assignment by searching for a frequency channel that is not effectively jammed by a communication channel previously assigned, nor will it jam other previously assigned channels; and wherein said programmed logic evaluates and creates an optimum channel assignment by the process of initially creating an ordered table for each terminal, listing for each assignable channel, any angular sector(s) of other base stations which would be co-channel jammed by that terminal assignment; on each request for channel assignment by a terminal, if the requesting terminal is one that is capable of interfering with other sectors, finding and selecting the last channel in the table that is jammed in an interfering sector but unjammed and currently unused in the present sector; if there is no such channel, searching for the last channel unjammed in an interfering sector; if there is no such channel, blocking the assignment, if the requesting terminal is not capable of interfering with others, finding and selecting the first channel in the table that is presently unassigned and unjammed in the present sector, selecting and assigning it; if there is none, blocking the assignment.

* * * * *